Sept. 27, 1927.
G. L. TARBOX
UNIVERSAL JOINT
Filed June 24, 1926
1,643,647
2 Sheets-Sheet 1
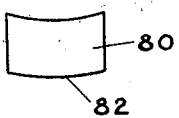
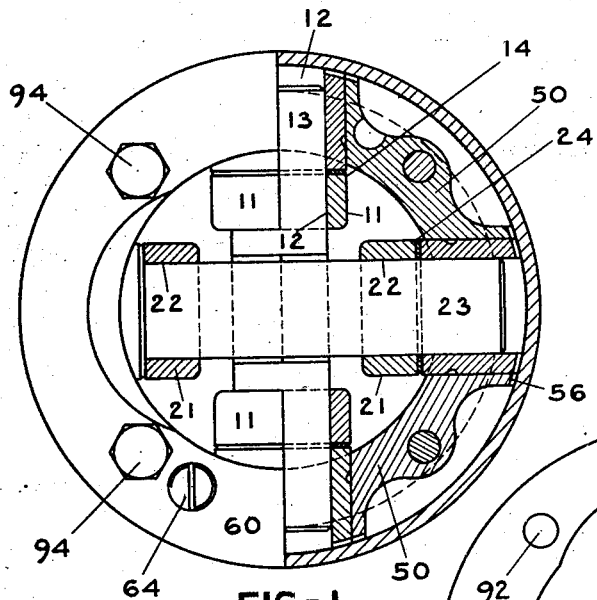
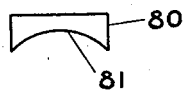
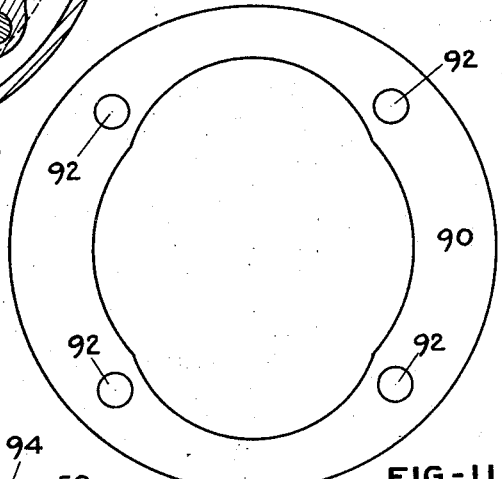
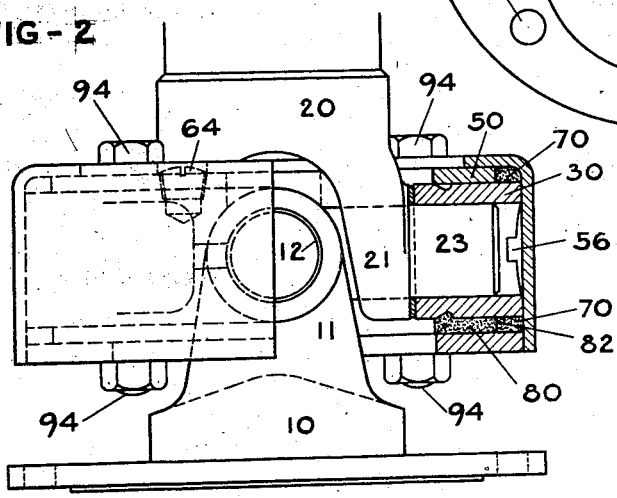
GURDON LUCIUS TARBOX
INVENTOR
BY
ATTORNEY Sept. 27, 1927.  G. L. TARBOX  1,643,647
UNIVERSAL JOINT
Filed June 24, 1926   2 Sheets-Sheet 2
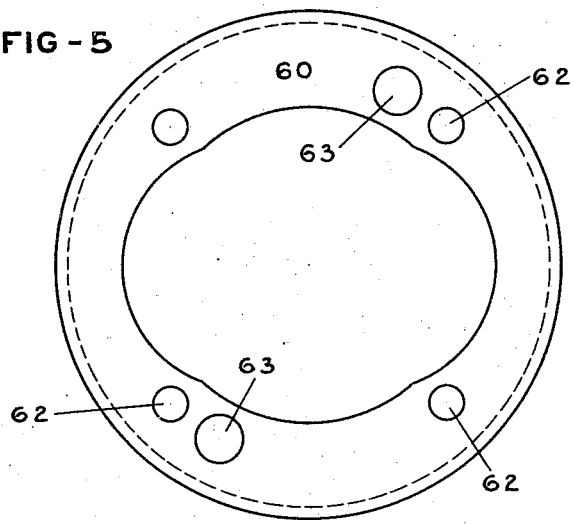
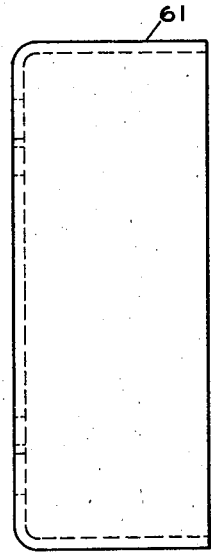
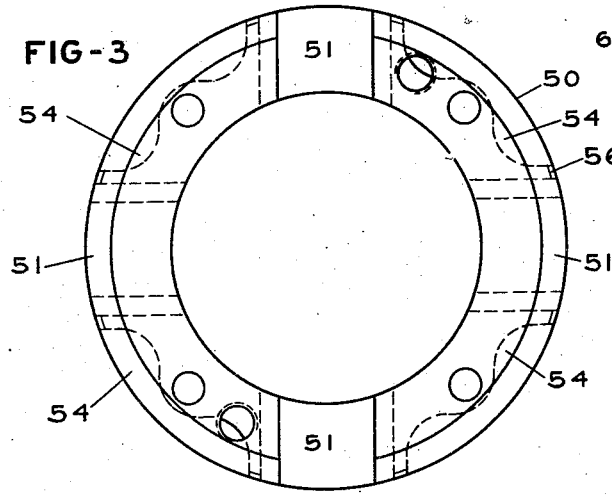
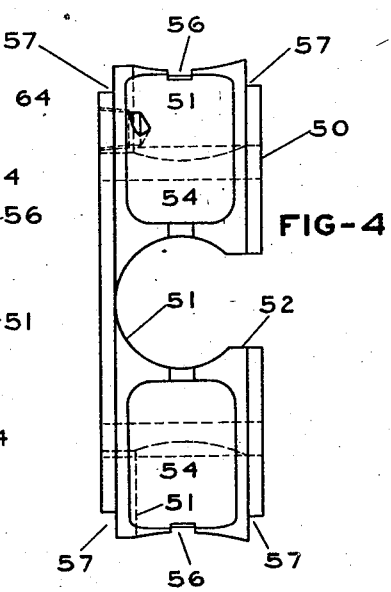
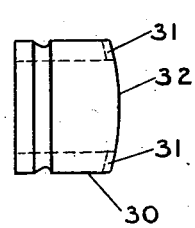
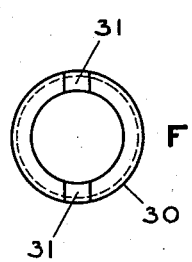
GURDON LUCIUS TARBOX
INVENTOR
ATTORNEY Patented Sept. 27, 1927.

1,643,647

UNITED STATES PATENT OFFICE.

GURDON LUCIUS TARBOX, OF NORTH PLAINFIELD, NEW JERSEY.

UNIVERSAL JOINT.

Application filed June 24, 1926. Serial No. 118,304.

My invention relates to universal joints such as are employed to connect rotatable power shafts of all kinds, and particularly to universal joints used on propeller shafts of automobiles, and has for its object to provide a commercial ring type joint that will be capable of withstanding the incidents of use. Further and more limited objects of the invention will appear in the specifications and will be realized in and through the combination of elements set forth in the claims.

In the drawings—Figure 1 represents a transverse view in part section of a universal joint embodying my invention.

Figure 2 is a longitudinal elevation in part section thereof.

Figure 3 is a detail view of my torque ring.

Figure 4 is a detail view of my torque ring at right angles to that shown in Figure 3.

Figure 5 is a view of my casing.

Figure 6 is a view of my casing at right angles to that shown in Figure 5.

Figures 7 and 8 are views of the bushings employed.

Figures 9 and 10 are views of my packing block.

Figure 11 is a plan view of my retaining ring.

Describing the various parts by reference characters and in connection with Figures 1 to 11 inclusive 10 and 20 denote hubs connected respectively with the driving and the driven shaft sections (not shown), the hubs are provided with yokes 11 and 21 each having through holes 12 and 22 to receive the trunnion pins 13 and 23 with a driving fit. These trunnion pins are cut away in the center to avoid interference during the angular operation of the joint. It will be observed that with the construction shown shoulders 14 and 24 are provided at each end of the yokes surrounding the base of the trunnions.

In the construction shown four bushings 30 are provided, adapted to work on the ends of the trunnion pins, and are held in spaced relations by the torque ring 50 in seats provided for the purpose. The bushings are provided with curved end 32 and slot 31 across the face thereof.

The torque ring 50 is an annular shell provided with four seats 51 extending radially therethrough. Each seat is slotted as shown at 52, said slots extending to the flat face of the torque ring—two slots to each face, as will be readily apparent by referring to Figures 3 and 4.

The outer periphery of the torque ring 50 is cut away as shown at 54 to provide the inner surfaces of lubricant containing chambers. These chambers are completed by the wall 61 of the casing 60 which entirely surrounds the torque ring.

The casing 60 is provided with a plurality of holes 62, for assembly purposes and holes 63 provided with plugs 64 or other lubricant fitting through which lubricant may be injected into the joint. It will be observed that the bushings 30 extend beyond the ends to provide space for the lubricant to circulate and the torque ring is cut away forming slots 56 providing a path for the lubricant from the chambers in the torque ring to the space beyond the ends of the trunnions. The slots 31 in the bushings register with the slots in the torque ring so that the lubricant has free circulation around the entire inside of the casing 60.

To prevent the joint from leaking due to centrifugal force I provide two circular packing rings 70 which fit in the grooves 57 in the torque ring. To fit in the space or slots 52 in the torque ring I provide packing blocks 80 curved on one face 81 to fit snugly against the outside face of the bushing and a curved face 82 to fit snugly against the packing ring 70 and a curved face 83 of the packing ring 70.

To hold the parts assembled I provide a retainer ring 90 provided with holes 92 which register with holes 62 in the casing through which bolts 94 are adapted to pass to hold the assembly together.

It will be observed that both the casing 60 and the retainer ring 90 are cut away in the central opening so as to straddle the trunnion pins and to provide means of assembly.

The assembly of the joint is as follows: The trunnion pins 13 and 23 are driven in the holes provided in the hubs 10 and 20 and the retaining ring 90 and casing 60 are slipped over the ends of the trunnions. The trunnions are then put into position from the opposite sides of the torque ring by passing them through the slots 52. The bushings 30 are then driven in the seats of the torque ring and over the trunnions. The driving of the bushings into the mutilated seats has a tendency to spring or bow the torque ring which will be brought back into line by clamping the casing 60 against the retaining ring 90 by means of the bolts 94. This produces a positive clamping effect of the torque ring upon the bushings securely holding them from turning in their seats.

I wish it distinctly understood that my universal joint herein described is in the form in which I desire to construct it but that changes or variations may be made as may be convenient or desirable without departing from the salient features of my invention and I therefore intend the following claims to cover such modifications as naturally fall within the lines of invention.

I claim:—

1. In a universal joint, the combination with a driving and driven member and trunnions carried thereby; a torque ring provided with radial seats; bushings interposed between the trunnions and the torque ring; slots, narrower than the outside diameter of the bushings but wider than the diameter of the trunnions, in the torque ring extending from each seat to one of the flat sides of the torque ring and means to tightly clamp the bushings in the seats of the torque ring to prevent the turning of the bushings.

2. In a universal joint, the combination with a driving and driven member and trunnions carried thereby, a torque ring provided with radial seats, two of said seats cut away forming openings on one side of the torque ring and two cut away forming openings on the other side of the torque ring, and bushings adapted to fit in the seats and provide bearings for the trunnions, the openings in the torque ring being narrower than the outside diameter of the bushings but wider than the diameter of the trunnions.

3. The device specified in claim 2 with the addition of means to clamp the bushings in said seats.

4. In a universal joint, the combination with a driving and driven member and trunnions carried thereby, a torque ring provided with seats to receive bushings for the trunnions, means permitting distortion of the ring upon insertion of the bushings, and means to restore the ring to its original shape thereby clamping the bushings in their seats and prevent their turning.

In testimony whereof I affix my signature.

GURDON LUCIUS TARBOX.